(12) United States Patent
Ishii et al.

(10) Patent No.: US 8,839,609 B2
(45) Date of Patent: Sep. 23, 2014

(54) EXHAUST GAS PROCESSING DEVICE FOR DIESEL ENGINE

(71) Applicant: Kubota Corporation, Osaka (JP)

(72) Inventors: Yuuki Ishii, Sakai (JP); Katsushi Inoue, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 27 days.

(21) Appl. No.: 13/790,767

(22) Filed: Mar. 8, 2013

(65) Prior Publication Data

US 2013/0255236 A1  Oct. 3, 2013

(30) Foreign Application Priority Data

Mar. 30, 2012  (JP) ................................. 2012-080833

(51) Int. Cl.
| | |
|---|---|
| *F01N 3/00* | (2006.01) |
| *F01N 3/02* | (2006.01) |
| *F01N 9/00* | (2006.01) |
| *F01N 3/023* | (2006.01) |

(52) U.S. Cl.
CPC *F01N 3/00* (2013.01); *F01N 9/002* (2013.01); *F01N 3/023* (2013.01); *Y02T 10/47* (2013.01); *F01N 2900/0422* (2013.01); *F01N 2900/0601* (2013.01)
USPC .................... 60/295; 60/285; 60/297; 60/311

(58) Field of Classification Search
USPC .................... 60/285, 295, 297, 311
See application file for complete search history.

(56) References Cited

U.S. PATENT DOCUMENTS

2005/0126162 A1* 6/2005 Otake et al. .................... 60/297
2011/0023468 A1* 2/2011 Yamada et al. ................ 60/287
2011/0146245 A1* 6/2011 Farman et al. ................. 60/286
2012/0017573 A1* 1/2012 Fujii et al. ...................... 60/295

FOREIGN PATENT DOCUMENTS

| | | |
|---|---|---|
| EP | 2410145 A1 | 1/2012 |
| JP | 2011-032943 A | 2/2011 |
| JP | 2011-043091 A | 3/2011 |
| JP | 2012-026280 A | 2/2012 |
| JP | 2012-159050 A | 8/2012 |

OTHER PUBLICATIONS

Extended European Search Report issued Jul. 29, 2013 in EP Application No. 13250019.0.

* cited by examiner

*Primary Examiner* — Audrey K Bradley
(74) *Attorney, Agent, or Firm* — Panitch Schwarze Belisario & Nadel LLP (57) ABSTRACT

Provided is an exhaust gas processing device for a diesel engine which can carry out sufficient regeneration processing of a DPF. A DPF regeneration control section continues normal regeneration processing by a DPF regeneration control section when an accelerated regeneration starting operation section does not perform accelerated regeneration starting operation after notification of accelerated regeneration requiring information is started. The DPF regeneration control section prohibits the normal regeneration processing, and an accelerated regeneration re-requirement notification section starts notification of accelerated regeneration re-requiring information, when a PM accumulation amount estimate becomes equal to or higher than an accelerated regeneration re-requirement determination value J4. Thereafter, the regeneration processing of the DPF is not carried out unless the accelerated regeneration starting operation section starts the accelerated regeneration starting operation to cause the DPF regeneration control section to carry out the accelerated regeneration processing by the DPF regeneration section.

9 Claims, 6 Drawing Sheets

EXHAUST GAS PROCESSING DEVICE FOR DIESEL ENGINE

BACKGROUND OF THE INVENTION

The present invention relates to an exhaust gas processing device for a diesel engine and specifically to an exhaust gas processing device for a diesel engine which can carry out sufficient regeneration processing of a DPF.

In the present description and the claims, DPF refers to a diesel particulate filter, PM refers to particulate matter in exhaust gas, and DOC refers to an oxidation catalyst.

Conventionally, there has been proposed an exhaust gas processing device for a diesel engine, the device including: a DPF; a PM accumulation amount estimating section for estimating an amount of PM accumulated in the DPF; a DPF regeneration section; a DPF regeneration control section; a storage section; and an accelerated regeneration requiring information notification section. When a PM accumulation estimate increases to a normal regeneration starting determination value, the DPF regeneration control section automatically starts normal regeneration processing by the DPF regeneration section to increase a temperature of exhaust gas to be passed through the DPF. Then, at the time of determination for accelerated regeneration requirement, when the PM accumulation amount estimate is equal to or higher than an accelerated regeneration requirement determination value, the DPF regeneration control section carries out notification of accelerated regeneration requiring information by the accelerated regeneration requiring information notification section. After the accelerated regeneration requiring information is notified, when an accelerated regeneration starting operation section carries out accelerated regeneration starting operation, the DPF regeneration control section switches from the normal regeneration processing to accelerated regeneration processing by the DPF regeneration section to increase the temperature of the exhaust gas to be passed through the DPF to make regeneration speed of the DPF higher than that in the normal regeneration (see FIGS. 1 and 2 of Japanese Patent Laid-open Publication No. 2011-32943, for example).

This type of exhaust gas processing device for the diesel engine has an advantage that the regeneration of the DPF can be finished quickly by the accelerated regeneration when it takes time to regenerate the DPF by the normal regeneration, which suppresses reduction in fuel efficiency and reduction in output due to extension of the regeneration processing of the DPF for a long time period.

However, when the accelerated regeneration starting operation section does not carry out the accelerated regeneration starting operation after the accelerated regeneration requiring information is notified, and if the DPF regeneration control section continues the normal regeneration processing by the DPF regeneration section, it may cause a trouble.

Regeneration of the DPF may end when it is incomplete.

When the accelerated regeneration starting operation section does not carry out the accelerated regeneration starting operation after the accelerated regeneration requiring information is notified, and if the DPF regeneration control section continues the normal regeneration processing by the DPF regeneration section, a condition for ending the normal regeneration such as continuation of an exhaust gas temperature equal to or higher than 500° C. for a predetermined time period may be satisfied, even though a substantial amount of PM is accumulated in the DPF and the accumulation amount of the PM has not sufficiently decreased, and the regeneration of the DPF may end when it is incomplete.

BRIEF SUMMARY OF THE INVENTION

An object of the present invention is to provide an exhaust gas processing device for a diesel engine which can carry out sufficient regeneration processing of a DPF.

Figure 1:
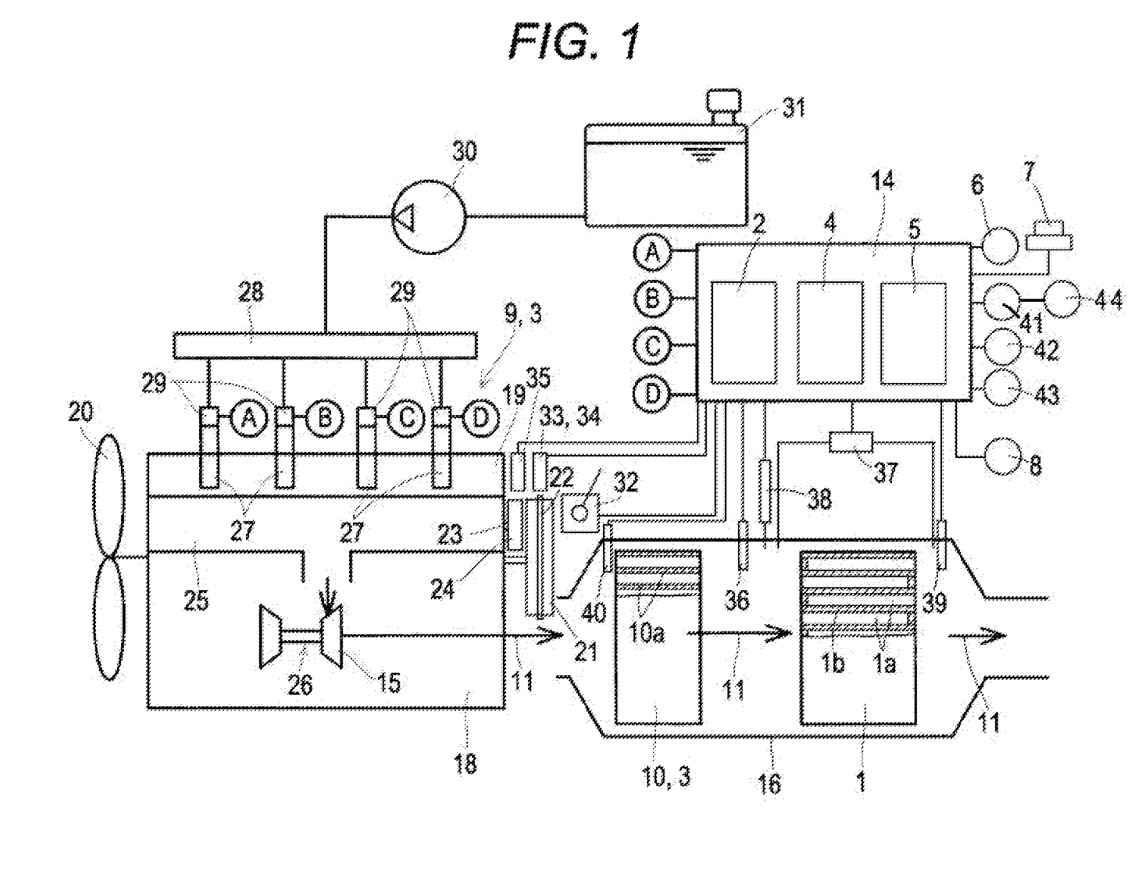
FIG. 1 is a schematic diagram of an exhaust gas processing device for a diesel engine according to an embodiment of the present invention.
Figure 2:
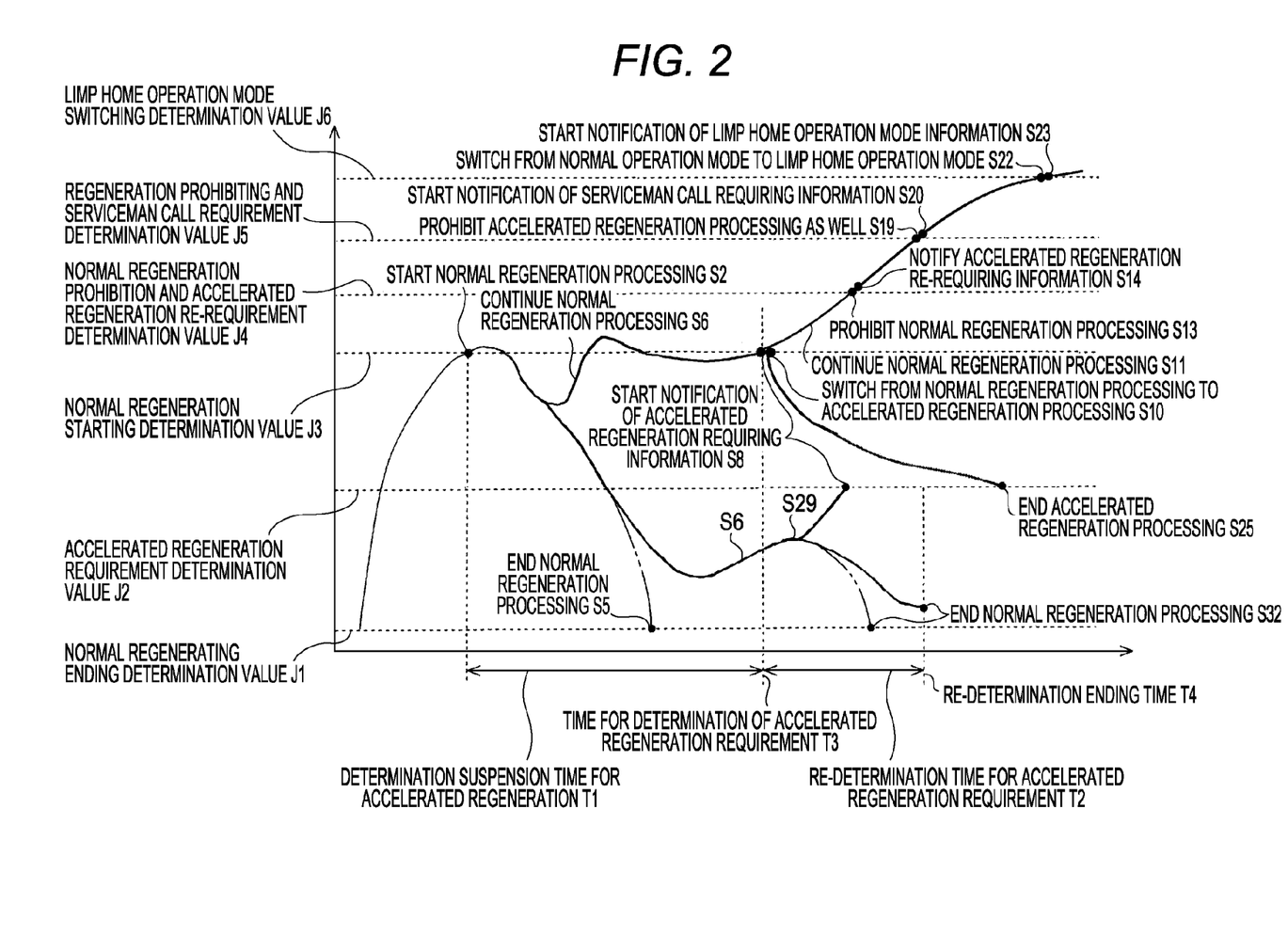
FIG. 2 is a time-sequence diagram of regeneration processing by the exhaust gas processing device for the diesel engine according to the embodiment of the invention.

As illustrated in FIGS. 1 and 2, an exhaust gas processing device for a diesel engine includes: a DPF (1); a PM accumulation amount estimating section (2) for PM accumulated in the DPF (1); a DPF regeneration section (3); a DPF regeneration control section (4); a storage section (5); an accelerated regeneration requiring information notification section (6); an accelerated regeneration starting operation section (7); and an accelerated regeneration re-requirement notification section (41), wherein an accelerated regeneration requirement determination value (J2), a normal regeneration starting determination value (J3), and a normal regeneration prohibition and accelerated regeneration re-requirement determination value (J4) higher than the determination values (J2) and (J3) are stored in the storage section (5), the DPF regeneration control section (4) compares a PM accumulation amount estimate obtained by the PM accumulation amount estimating section (2) with the plurality of determination values (J2), (J3), and (J4), and the DPF regeneration control section (4) automatically starts normal regeneration processing by the DPF regeneration section (3) (S2) to increase a temperature of exhaust gas (11) to be passed through the DPF (1) when the PM accumulation amount estimate increases to the normal regeneration starting determination value (J3), the DPF regeneration control section (4) starts notification of accelerated regeneration requiring information by the accelerated regeneration requiring information notification section (6) when the PM accumulation amount estimate is equal to or higher than the accelerated regeneration requirement determination value (J2) as a result of determination for accelerated regeneration requirement after that, the DPF regeneration control section (4) switches the normal regeneration processing by the DPF regeneration section (3) to accelerated regeneration processing (S 10) to increase the temperature of the exhaust gas (11) to be passed through the DPF (1) as in the normal regeneration processing to make regeneration speed of the DPF (1) higher than that in the normal regeneration processing when the accelerated regeneration starting operation section (7) carries out accelerated regeneration starting operation after the notification of the accelerated regeneration requiring information is started (S8), the DPF regeneration control section (4) continues the normal regeneration processing by the DPF regeneration section (3) (S11) when the accelerated regeneration starting operation section (7) does not carry out the accelerated regeneration starting operation after the notification of the accelerated regeneration requiring information is started (S8), and the DPF regeneration control section (4) prohibits the normal regeneration processing (S13) and the accelerated regeneration re-requirement notification section (41) starts notification of the accelerated regeneration re-requiring information (S14) when the PM accumulation amount estimate becomes equal to or higher than the normal regeneration prohibition and accelerated regeneration re-requirement determination value (J4), and thereafter, the regeneration processing of the DPF (1) is not carried out unless the accelerated regeneration starting operation section (7) starts the accelerated regeneration starting operation (S16) to cause the DPF regeneration control section (4) to carry out the accelerated regeneration processing by the DPF regeneration section (3).

It is possible to carry out sufficient regeneration processing of a DPF. As illustrated in FIGS. 1 and 2, the DPF regeneration control section (4) continues the normal regeneration processing by the DPF regeneration section (3) (S11) when the accelerated regeneration starting operation section (7) does not carry out the accelerated regeneration starting operation after the notification of the accelerated regeneration requiring information is started (S8), and the DPF regeneration control section (4) prohibits the normal regeneration processing (S13) and the accelerated regeneration re-requirement notification section (41) starts notification of the accelerated regeneration re-requiring information (S14) when the PM accumulation amount estimate becomes equal to or higher than the normal regeneration prohibition and accelerated regeneration re-requirement determination value (J4), and thereafter, the regeneration processing of the DPF (1) is not carried out unless the accelerated regeneration starting operation section (7) starts the accelerated regeneration starting operation (S16) to cause the DPF regeneration control section (4) to carry out the accelerated regeneration processing by the DPF regeneration section (3). Therefore, when a substantial amount of PM is accumulated in the DPF (1), it is possible to induce an operator or a driver to start the accelerated regeneration starting operation (S16) to carry out the accelerated regeneration processing at high regeneration speed so that the sufficient regeneration processing of the DPF (1) can be carried out.

It is possible to let the driver know that an immediate step needs to be taken. As illustrated in FIGS. 1 and 2, the DPF regeneration control section (4) prohibits the normal regeneration and the accelerated regeneration by the DPF regeneration section (3) and the serviceman call requiring information notification section (42) starts the notification of the serviceman call requiring information (S20) when the PM accumulation amount estimate becomes equal to or higher than the regeneration prohibiting and serviceman call requirement determination value (J5). Therefore, it is possible to let the driver know that an immediate step such as regeneration of the DPF and replacement of the DPF needs to be taken by a professional at a maintenance factory.

It is possible to prevent heat damage to the DPF. As illustrated in FIGS. 1 and 2, the DPF regeneration control section (4) prohibits the normal regeneration and the accelerated regeneration by the DPF regeneration section (3) when the PM accumulation amount estimate becomes equal to or higher than the regeneration prohibiting and serviceman call requirement determination value (J5). Therefore, it is possible to prevent the heat damage to the DPF (1) due to incorrect regeneration processing operation by the driver.

Examples of the incorrect regeneration processing operation by the driver are idling while carrying out the normal regeneration processing and interruption of the accelerated regeneration processing at some midpoint of the processing even though the PM accumulated in the DPF (1) is burning. If such operation is carried out, heat of the burning PM is accumulated in the DPF (1) due to reduction in emission and may cause the heat damage to the DPF (1).

It is possible to prevent heat damage to the DPF. As illustrated in FIGS. 1 and 2, an engine control section (14) switches an engine operation state from a normal operation mode to a limp home operation mode (S22) to restrict engine output more than that in the normal operation mode when the PM accumulation amount estimate becomes equal to or higher than the limp home operation mode switching determination value (J6). Therefore, it is possible to suppress burning of the PM accumulated in the DPF (1) to prevent the heat damage to the DPF (1).

It is possible to suppress reduction in fuel efficiency and reduction in output. As illustrated in FIG. 2, when the PM accumulation amount estimate stays around the normal regeneration starting determination value (J3) for a reason such as PM burning and removing speed and PM accumulation speed comparing with each other even though the DPF regeneration control section (4) automatically starts the normal regeneration processing (S2) after the PM accumulation amount estimate has increased to the normal regeneration starting determination value (J3), the notification of the accelerated regeneration requiring information is started (S8) at a time (T3) for determination of the accelerated regeneration requirement when the determination suspension time (T1) for the accelerated regeneration requirement has elapsed. Therefore, it is possible to quickly switch from the normal regeneration processing to the accelerated regeneration processing (S10) to thereby suppress reduction in fuel efficiency and reduction in output due to extension of the normal regeneration processing for a long time period.

It is possible to suppress extension of the normal regeneration processing for a long time period after the determination suspension time for the accelerated regeneration requirement has elapsed. As illustrated in FIG. 2, the DPF regeneration control section (4) ends the normal regeneration processing (S32) or starts the notification of the accelerated regeneration requiring information (S8) during the re-determination time (T2) for the accelerated regeneration requirement. Therefore, it is possible to suppress extension of the normal regeneration processing for a long time period after the determination suspension time (T1) for the accelerated regeneration requirement has elapsed.

It is possible to suppress extension of the accelerated regeneration processing for a long time period. As illustrated in FIG. 2, the DPF regeneration control section (4) ends the accelerated regeneration processing (S25) when the PM accumulation amount estimate decreases to the accelerated regeneration requirement determination value (J2) which is a lower limit for the accelerated regeneration requirement. Therefore, it is possible to suppress continuation of the accelerated regeneration processing for a long time period.

In this case, even if the accelerated regeneration processing is ended, since the PM accumulation amount estimate has decreased to the lower limit for the accelerated regeneration requirement, clog in the DPF (1) is substantially cleared, reduction in the output due to increase in back pressure is suppressed to a certain degree, and no trouble is caused in operation of the engine after the end of the accelerated regeneration processing.

It is possible to suppress extension of the normal regeneration processing for a long time period. As illustrated in FIG. 2, the DPF regeneration control section (4) ends the normal regeneration processing (S5), (S32) when the PM accumulation estimate decreases to the normal regeneration ending determination value (J1) as a result of the normal regeneration processing. Therefore, it is possible to suppress extension of the normal regeneration processing for a long time period.

The accelerated regeneration processing does not cause any problem in traveling and working of the machine mounted with the engine. The normal regeneration processing is carried out while at least one of the traveling and the working of the machine mounted with the engine is carried out, and the accelerated regeneration processing is carried out while both of the traveling and the working of the machine mounted with the engine are interrupted. Therefore, the accelerated regeneration processing does not cause any trouble in the traveling and the working of the machine mounted with the engine.

The regeneration of the DPF can be achieved by a combination of a common rail system and a DOC. As shown in FIG. 1, the regeneration of the DPF (1) can be achieved by the combination of the common rail system (9) and the DOC (10).

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

FIGS. 1 to 6 are drawings for describing an exhaust gas processing device for a diesel engine according to an embodiment of the present invention. In the embodiment, the exhaust gas processing device for a multicylinder diesel engine will be described.

General description of the diesel engine shown in FIG. 1 is as follows.

A cylinder head (19) is mounted to an upper portion of a cylinder block (18), an engine cooling fan (20) is disposed in front of the cylinder block (18), a flywheel (21) is disposed behind the cylinder block (18), and a rotor plate (22) is mounted to the flywheel (21). Behind the cylinder block (18), a sensor plate (24) attached to a valve gear cam shaft (23) is disposed. An exhaust gas manifold (25) is disposed on one side of the cylinder head (19), and a supercharger (26) communicates with the exhaust gas manifold (25). On a downstream side of a turbine (15) of the supercharger (26), a DPF case (16) housing a DPF (1) is disposed. The DPF case (16) also houses a DOC (10). Injectors (27) are disposed in the cylinder head (19) for respective cylinders and connected to a common rail (28). Each of the injectors (27) is provided with a solenoid valve (29). A fuel tank (31) is connected to the common rail (28) with a fuel supply pump (30) interposed therebetween.

As shown in FIG. 1, a target engine speed setting section (32), an actual engine speed detecting section (33), a crank angle detecting section (34), and a cylinder determination section (35) are linked to the solenoid valves (29) of the injectors (27) through an engine control section (14). The target engine speed setting section (32) is a potentiometer for outputting the target engine speed as a voltage value based on a set position of a speed regulating lever. The actual engine speed detecting section (33) and the crank angle detecting section (34) are a pickup coil facing an outer periphery of the rotor plate (22) which detects the number of many teeth provided at regular intervals on the outer periphery of the rotor plate (22) to detect the actual engine speed and the crank angle. The cylinder determination section (35) is a sensor for determining which stroke of a combustion cycle each of the cylinders is at by detecting a protrusion provided to the sensor plate (24). The engine control section (14) is an engine ECU. ECU is an abbreviation for "electronic control unit".

The engine control section (14) controls valve opening timing and a valve opening duration time of the solenoid valves (29) of the injectors (27) so as to reduce a deviation of the actual engine speed from the target engine speed, and causes the injectors (27) to inject predetermined amounts of fuel into combustion chambers at the predetermined time for injection.

A structure of the exhaust gas processing device is as follows.

As shown in FIG. 1, the exhaust gas processing device includes a DPF (1), a PM accumulation amount estimating section (2) of PM accumulated in the DPF (1), a DPF regeneration section (3), a DPF regeneration control section (4), a storage section (5), an accelerated regeneration requiring information notification section (6), an accelerated regeneration starting operation section (7), and an accelerated regeneration re-requirement notification section (41).

As shown in FIG. 1, the DPF (1) is a ceramic honeycomb carrier and is a wall flow monolith in which end portions of adjacent cells (1a) are alternately closed. Exhaust gas passes through insides of the cells (1a) and walls (1b) of the cells (1a), and the walls (1b) of the cells (1a) capture the PM.

The PM accumulation amount estimating section (2) is a predetermined arithmetic section of the engine ECU, which is the engine control section (14), and estimates a PM accumulation amount from map data experimentally obtained in advance based on an engine load, an engine speed, an exhaust gas temperature detected by a DPF upstream-side exhaust gas temperature sensor (36), exhaust gas pressure on an upstream side of the DPF and detected by a DPF upstream-side exhaust gas pressure sensor (38), and a pressure difference between pressure on the upstream side and pressure on a downstream side of the DPF (1) and detected by a differential pressure sensor (37).

As shown in FIG. 1, the DPF regeneration section (3) is formed by a combination of a common rail system (9) and a DOC (10) disposed on an upstream side of the DPF (1), and unburned fuel is mixed into the exhaust gas by post injection carried out after main injection from an injector (27) of the common rail system (9), and the DOC (10) oxidizes and burns the unburned fuel with oxygen in the exhaust gas to increase the temperature of the exhaust gas (11) passing through the DPF (1) in the normal regeneration processing and the accelerated regeneration processing.

The DOC (10) is a flow-through structure having an oxidation catalyst carried by a ceramic honeycomb carrier, and opposite ends of cells (10a) are open. The exhaust gas (11) passes through insides of the cells (10a).

As shown in FIG. 1, when a temperature of the exhaust gas (11) on the upstream side of the DOC and detected by a DOC upstream-side exhaust gas temperature sensor (40) is lower than an activation temperature of the DOC (10), the DPF regeneration control section (4) causes the injectors (27) of the common rail system (9) to carry out after injection which is after the main injection and before the post injection, or reduces an opening degree of an intake throttle to increase the temperature of the exhaust gas (11) to activate the DOC (10).

When a temperature of the exhaust gas (11) on the downstream side of the DPF and detected by a DPF downstream-side exhaust gas temperature sensor (39) is higher than a predetermined abnormal determination temperature, the DPF regeneration control section (4) starts notification of DPF abnormal information by a DPF abnormal information notification section (8), stops the post injection, and reduces injection amounts in the post injection simultaneously.

The DPF regeneration section (3) may be formed by a combination of an injector for injecting the fuel into an exhaust pipe and the DOC, or by an electric heater disposed at an inlet of the DPF.

As shown in FIG. 1, the DPF regeneration control section (4) is provided to the engine ECU which is the engine control section (14).

The storage section (5) is a memory provided to the engine ECU which is the control section (14).

Stored in the storage section (5) are an accelerated regeneration requirement determination value (J2), a normal regeneration starting determination value (J3), and a normal regeneration prohibition and accelerated regeneration re-requirement determination value (J4) higher than these determination values (J2) and (J3) shown in FIG. 2.

As shown in FIGS. 1 and 2, the DPF regeneration control section (4) compares the PM accumulation amount estimate obtained by the PM accumulation amount estimating section (2) with the plurality of determination values (J2), (J3), and (J4). When the PM accumulation amount estimate increases to the normal regeneration starting determination value (J3), the DPF regeneration control section (4) automatically starts the normal regeneration processing by the DPF regeneration section (3) (S2) to increase the temperature of the exhaust gas (11) to be passed through the DPF (1).

At the time of determination of the accelerated regeneration requirement after that, when the PM accumulation amount estimate is equal to or higher than the accelerated regeneration requirement determination value (J2), the DPF regeneration control section (4) starts notification of the accelerated regeneration requiring information by the accelerated regeneration requiring information notification section (6) (S8).

After the notification of the accelerated regeneration requiring information is started (S8), if the accelerated regeneration starting operation section (7) carries out accelerated regeneration starting operation, the DPF regeneration control section (4) switches from the normal regeneration processing to the accelerated regeneration processing by the DPF regeneration section (3) (S10) to increase the temperature of the exhaust gas (11) to be passed through the DPF (1) as in the normal regeneration processing to make regeneration speed of the DPF (1) higher than that in the normal regeneration processing.

After the notification of the accelerated regeneration requiring information is started (S8), when the accelerated regeneration starting operation section (7) does not carry out the accelerated regeneration starting operation, the DPF regeneration control section (4) continues the normal regeneration processing by the DPF regeneration section (3) (S11). When the PM accumulation amount estimate becomes equal to or higher than the normal regeneration prohibition and accelerated regeneration re-requirement determination value (J4), the DPF regeneration control section (4) prohibits the normal regeneration processing (S13), and the accelerated regeneration re-requirement notification section (41) starts notification of accelerated regeneration re-requiring information (S14). Thereafter, the regeneration processing of the DPF (1) is not carried out unless the accelerated regeneration starting operation section (7) starts the accelerated regeneration starting operation (S16) to cause the DPF regeneration control section (4) to carry out the accelerated regeneration processing by the DPF regeneration section (3).

In the accelerated regeneration processing, as compared with the normal regeneration processing, injection amounts in the main injection and the post injection are increased to increase the temperature (average temperature) of the exhaust gas (11) to increase the regeneration speed of the DPF (1).

The accelerated regeneration requiring information notification section (6) is a lamp provided to a dashboard of a machine mounted with the diesel engine, and the information that the accelerated regeneration is required is notified by lighting of the lamp. For the accelerated regeneration requiring information notification section (6), there may be used an indicating lamp, an LED, a liquid crystal display, an organic EL display, an alarm buzzer, and the like provided to the dashboard or the like. LED is an abbreviation for "light emitting diode" and EL is an abbreviation for "electroluminescence".

The accelerated regeneration starting operation section (7) is an operation button provided to the dashboard, and carries out the accelerated regeneration starting operation when a driver or the like manually pushes the operation button. For the accelerated regeneration starting operation section (7), there may be used an operation button, an operation switch, and an operation lever provided to the dashboard or the like, and an operation pedal provided near a floor on a driver's side.

The accelerated regeneration re-requirement notification section (41) is a lamp provided to the dashboard of the machine mounted with the diesel engine, and the information that the accelerated regeneration is re-required is notified by lighting of the lamp. For the accelerated regeneration re-requirement notification section (41), there may be used an indicating lamp, an LED, a liquid crystal display, an organic EL display, an alarm buzzer, and the like provided to the dashboard or the like.

In notifying the information that the accelerated regeneration is re-required, the DPF regeneration control section (4) simultaneously carries out notification of the normal regeneration prohibiting information indicating that the normal regeneration processing is prohibited by the normal regeneration prohibiting information notification section (44). The normal regeneration prohibiting information notification section (44) is a lamp provided to the dashboard of the machine mounted with the diesel engine, and the information that the normal regeneration processing is prohibited is notified by lighting of the lamp. For the normal regeneration prohibiting information notification section (44), there may be used an indicating lamp, an LED, a liquid crystal display, an organic EL display, an alarm buzzer, and the like provided to the dashboard or the like.

As shown in FIGS. 1 and 2, a serviceman call requiring information notification section (42) is provided, and a regeneration prohibiting and serviceman call requirement determination value (J5) higher than the accelerated regeneration re-requirement determination value (J4) is stored in the storage section (5). When the PM accumulation amount estimate becomes equal to or higher than the regeneration prohibiting and serviceman call requirement determination value (J5), the DPF regeneration control section (4) prohibits the normal regeneration and the accelerated regeneration by the DPF regeneration section (3), and the serviceman call requiring information notification section (42) starts notification of the serviceman call requiring information (S20).

The serviceman call requiring information notification section (42) is a lamp provided to the dashboard of the machine mounted with the diesel engine, and the information that a call of the serviceman is required is notified by lighting of the lamp. For the serviceman call requiring information notification section (42), there may be used an indicating lamp, an LED, a liquid crystal display, an organic EL display, an alarm buzzer, and the like provided to the dashboard or the like.

As shown in FIGS. 1 and 2, the engine control section (14) is provided, and a limp home operation mode switching determination value (J6) higher than the normal regeneration prohibition and accelerated regeneration re-requirement determination value (J4) is stored in the storage section (5). When the PM accumulation estimate becomes equal to or higher than the limp home operation mode switching determination value (J6), the engine control section (14) switches an engine operation state from a normal operation mode to a limp home operation mode (S22) and restricts engine output more than that in the normal operation mode.

The engine includes a limp home operation mode notification section (43). The limp home operation mode notification section (43) is a lamp provided to the dashboard of the machine mounted with the diesel engine, and the information that the operation state has been switched from the normal operation mode to the limp home operation mode is notified by lighting of the lamp. For the limp home operation mode notification section (43), there may be used an indicating lamp, an LED, a liquid crystal display, an organic EL display, an alarm buzzer, and the like provided to the dashboard or the like.

As shown in FIGS. 1 and 2, a determination suspension time (T1) for the accelerated regeneration requirement is stored in the storage section (5), the normal regeneration starting determination value (J3) is higher than the accelerated regeneration requirement determination value (J2), a time (T3) for determination of the accelerated regeneration requirement is when the determination suspension time (T1) for the accelerated regeneration requirement has elapsed without ending the normal regeneration processing (S5) after the PM accumulation amount estimate increased to the normal regeneration starting determination value (J3).

As shown in FIGS. 1 and 2, a re-determination time (T2) for the accelerated regeneration requirement is stored in the storage section (5). When the PM accumulation amount estimate is lower than the accelerated regeneration requirement determination value (J2) at the determination time (T3) for the accelerated regeneration requirement, the DPF regeneration control section (4) continues the normal regeneration processing (S29) even during the re-determination time (T2) for the accelerated regeneration requirement subsequent to the determination time (T3) for the accelerated regeneration requirement. When the PM accumulation amount estimate increases to the accelerated regeneration requirement determination value (J2) during the re-determination time (T2) for the accelerated regeneration requirement, the DPF regeneration control section (4) starts the notification of the accelerated regeneration requiring information by the accelerated regeneration requiring information notification section (6) (S8).

A time when the re-determination time (T2) for the accelerated regeneration requirement has elapsed is defined as a re-determination ending time (T4). When the DPF accumulation estimate has not increased to the accelerated regeneration requirement determination value (J2) at the re-determination ending time (T4), the DPF regeneration control section (4) ends the normal regeneration processing (S32).

As shown in FIGS. 1 and 2, when the DPF regeneration control section (4) is carrying out the accelerated regeneration processing by the DPF regeneration section (3), and when the PM accumulation amount estimate decreases to the accelerated regeneration requirement determination value (J2) which is a lower limit for the accelerated regeneration requirement, the DPF regeneration control section (4) ends the accelerated regeneration processing (S25).

As shown in FIGS. 1 and 2, a normal regeneration ending determination value (J1) lower than the accelerated regeneration requirement determination value (J2) is stored in the storage section (5). When the PM accumulation estimate is reduced to the normal regeneration ending determination value (J1) as a result of the normal regeneration processing, the DPF regeneration control section (4) ends the normal regeneration processing (S5), (S32).

The normal regeneration processing and the accelerated regeneration processing may be ended on condition that an exhaust gas temperature equal to or higher than 500° C. has continued for a certain period of time, or an exhaust gas temperature equal to or higher than 600° C. has continued for a certain period of time.

The normal regeneration processing is carried out during operation of the machine mounted with the engine when at least one of traveling and working is carried out by the machine. The accelerated regeneration processing is carried out during a non-operating time of the machine mounted with the engine when both the traveling and the working by the machine are interrupted.

A flow of the regeneration processing by the engine ECU which is the engine control section is as follows.

Figure 3:
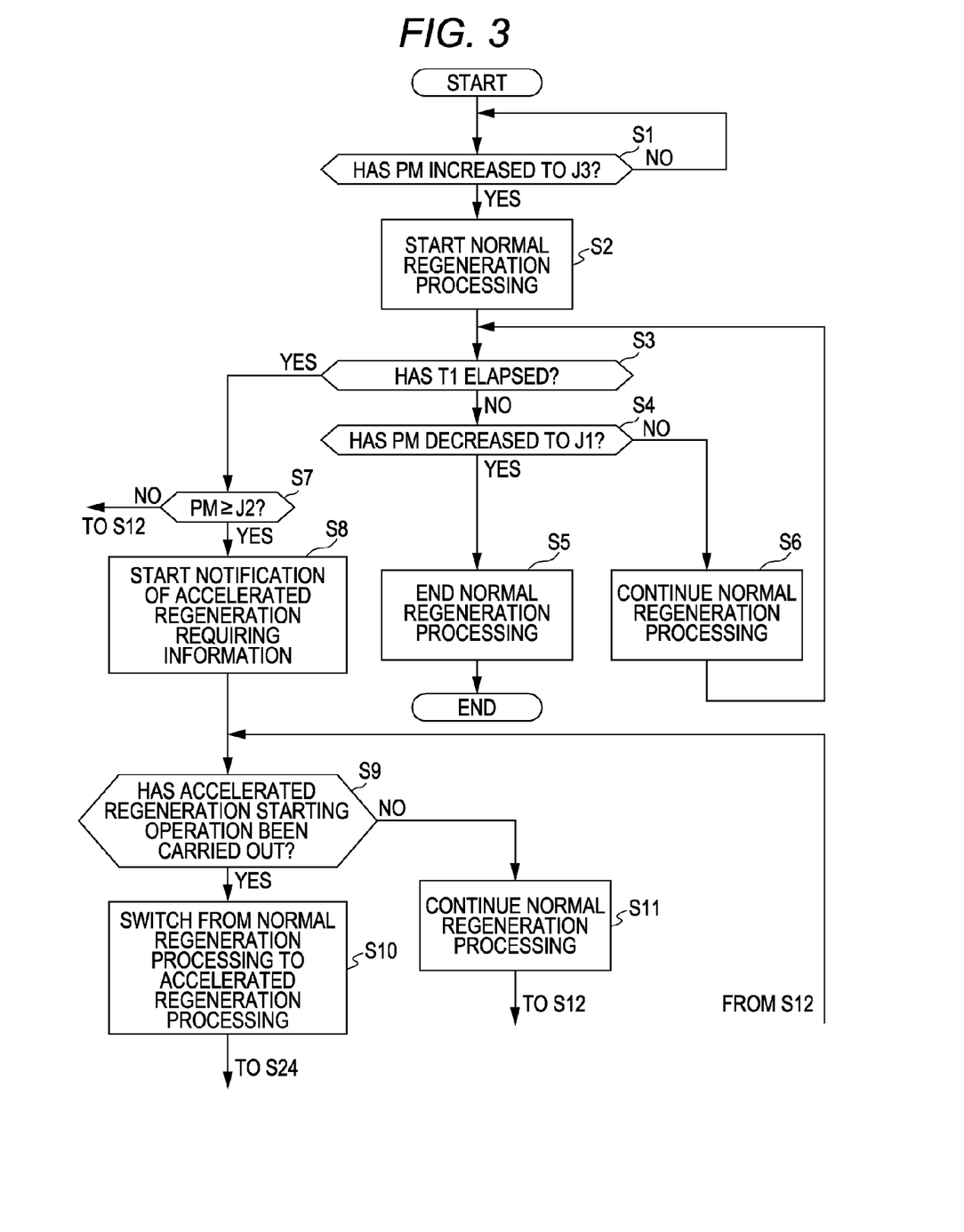
FIG. 3 is a part of a flowchart of the regeneration processing by the exhaust gas processing device for the diesel engine according to the embodiment of the invention.

As shown in FIG. 3, in step (S1), it is determined whether or not the PM accumulation amount estimate has increased to the normal regeneration determination value (J3). If it is determined as NO, the determination is repeated. If it is determined as YES, the normal regeneration processing is started in step (S2).

Next, in step (S3), it is determined whether or not the determination suspension time (T1) for the accelerated regeneration requirement has elapsed after the start of the normal regeneration processing. If it is determined as NO, whether or not the PM accumulation amount estimate has decreased to the normal regeneration ending determination value (J1) is determined in step (S4). If it is determined as YES, the normal regeneration processing is ended in step (S5). If it is determined as NO in step (S4), the normal regeneration processing is continued in step (S6), and the process returns to step (S3).

As shown in FIG. 3, if it is determined as YES in step (S3), whether or not the PM accumulation estimate is a value equal to or higher than the accelerated regeneration requirement determination value (J2) is determined in step (S7). If it is determined as YES, the notification of the accelerated regeneration requiring information is started in step (S8).

Next, in step (S9), it is determined whether or not the accelerated regeneration starting operation has been carried out. If it is determined as YES, the normal regeneration processing is switched to the accelerated regeneration processing in step (S10). If it is determined as NO in step (S9), the normal regeneration processing is continued in step (S11), and the process goes to step (S12).

Figure 4:
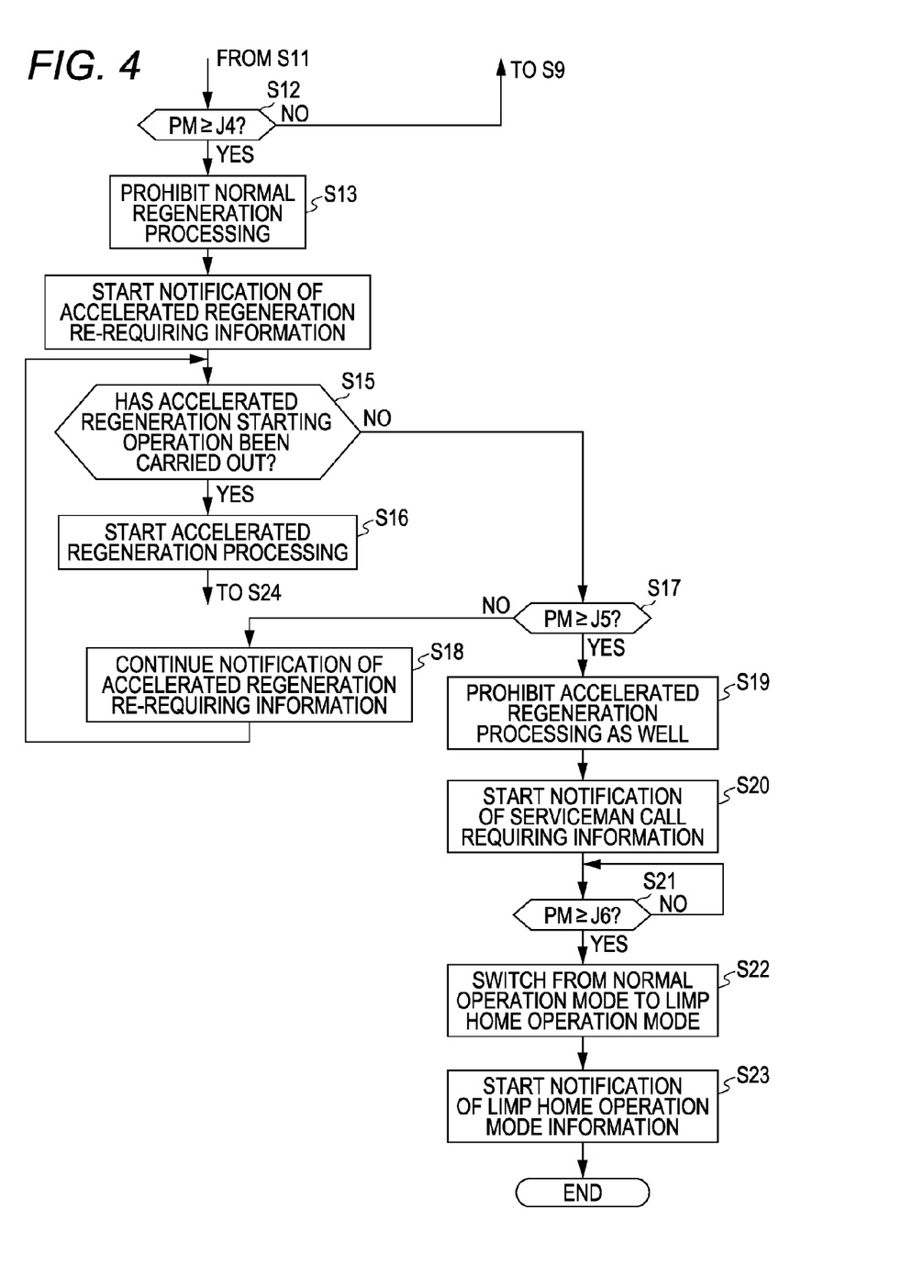
FIG. 4 is a continuation of step (S11) of the flowchart shown in FIG. 3.

As shown in FIG. 4, in step (S12), it is determined whether or not the PM accumulation estimate is a value equal to or higher than the accelerated regeneration re-requirement determination value (J4). If it is determined as YES, the normal regeneration processing is prohibited in step (S13), and the notification of the accelerated regeneration re-requiring information is started in step (S14). In step (S15), it is determined whether or not the accelerated regeneration starting operation has been carried out.

If it is determined as YES in step (S15), the accelerated regeneration processing is started in step (S16), and the process goes to step (S24).

If it is determined as NO in step (S15), it is determined in step (S17) whether or not the PM accumulation estimate is a value equal to or higher than the regeneration prohibition and serviceman call requirement determination value (J5).

If it is determined as YES in step (S17), the process goes to step (S19). If it is determined as NO, the notification of the accelerated regeneration re-requiring information is continued in step (S18), and the process returns to step (S15).

As shown in FIG. 4, the accelerated regeneration processing is prohibited as well as the normal regeneration in step (S19), and the notification of the serviceman call requiring information is started in step (S20). At the same time, the notification of the regeneration prohibiting information indicating that the regeneration processing is prohibited is started.

In subsequent step (S21), it is determined whether or not the PM accumulation estimate is a value equal to or higher than the limp home operation mode switching determination value (J6). If it is determined as YES, the engine operation state is switched from the normal operation mode to the limp home operation mode in step (S22) to restrict the engine output more than that in the normal operation mode, and the notification of the limp home operation mode information is started in step (S23). If it is determined as NO in step (S21), the determination in step (S21) is repeated. If it is determined as NO in step (S12), the process returns to step (S9).

Figure 5:
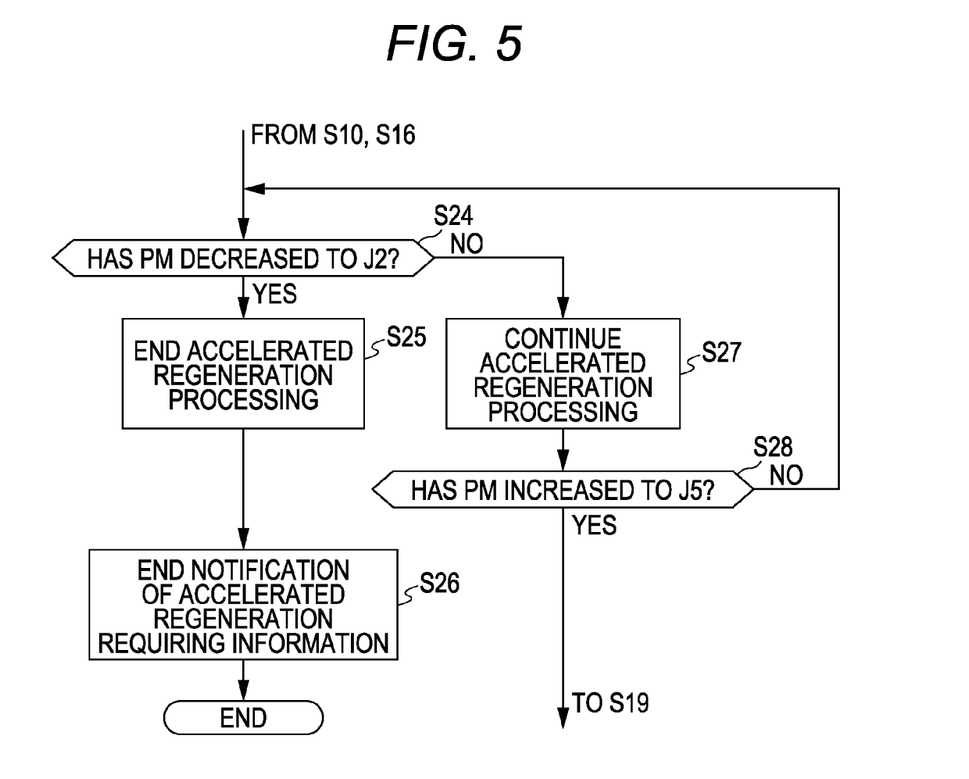
FIG. 5 is a continuation of steps (S10), (S16) of the flowcharts shown in FIGS. 3 and 4.

As shown in FIG. 5, after the normal regeneration processing is switched to the accelerated regeneration processing in step (S10), it is determined in step (S24) whether or not the PM accumulation amount estimate has decreased to the accelerated regeneration requirement determination value (J2) which is the lower limit for the accelerated regeneration requirement.

If it is determined as YES in step (S24), the accelerated regeneration processing is ended in step (S25), and the notification of the accelerated regeneration requiring information is ended in step (S26).

If it is determined as NO in step (S24), the accelerated regeneration processing is continued in step (S27). In step (S28), it is determined whether or not the PM accumulation amount estimate is a value equal to or higher than the regeneration prohibition and serviceman call requirement determination value (J5).

If it is determined as YES in step (S28), the process goes to step (S19). If it is determined as NO in step (S28), the process returns to step (S24).

Figure 6:
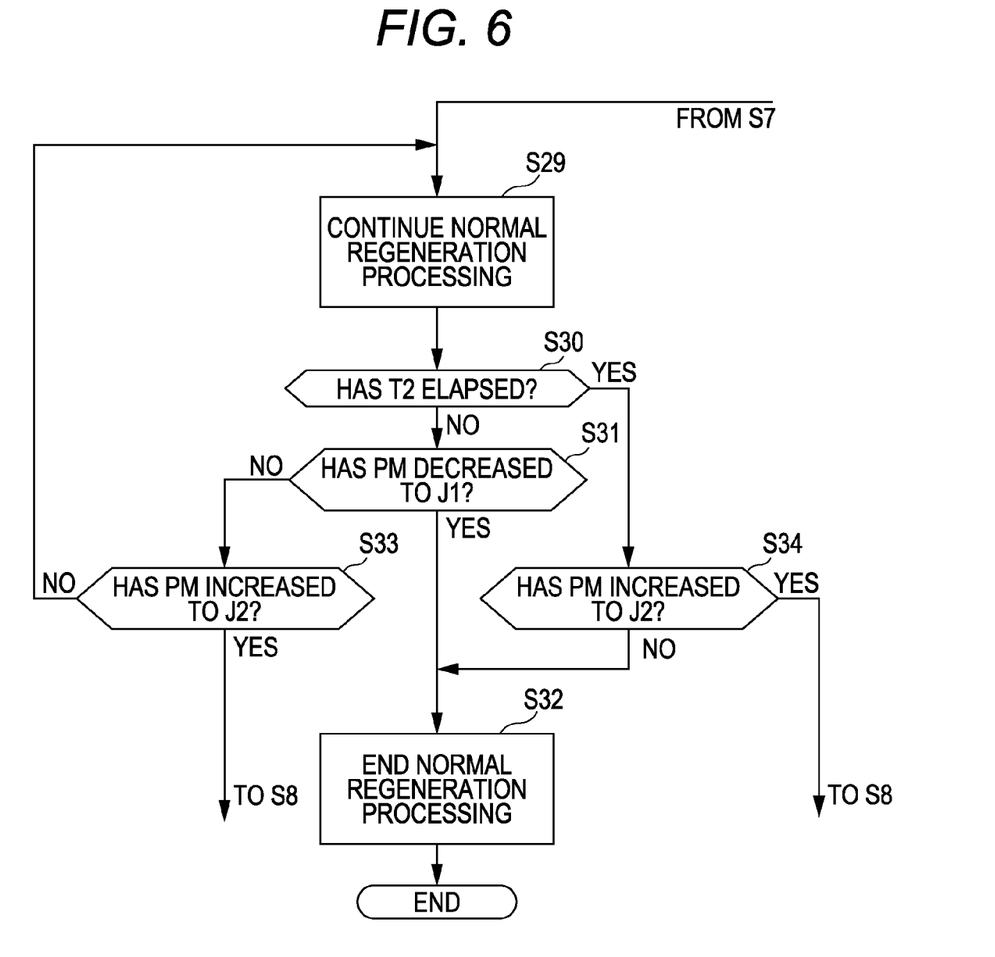
FIG. 6 is a continuation of step (S7) of the flowchart shown in FIG. 3.

As shown in FIG. 6, if it is determined as NO in step (S7), the normal regeneration processing is continued in step (S29). In step (S30), it is determined whether or not the re-determination time (T2) for the accelerated regeneration requirement has elapsed.

If it is determined as NO in step (S30), it is determined in step (S31) whether or not the PM accumulation amount estimate has decreased to the normal regeneration ending determination value (J1).

If it is determined as YES in step (S31), the normal regeneration processing is ended in step (S32).

If it is determined as NO in step (S31), it is determined in step (S33) whether or not the DPF accumulation estimate has increased to the accelerated regeneration requirement determination value (J2).

If it is determined as YES in step (S33), the process goes to step (S8).

If it is determined as NO in step (S33), the process returns to step (S29).

If it is determined as YES in step (S30), it is determined in step (S34) whether or not the PM accumulation amount estimate has increased to the accelerated regeneration requirement determination value (J2). If it is determined as NO, the normal regeneration processing is ended in step (S32), even if the PM accumulation estimate has not decreased to the normal regeneration ending determination value (J1).

If it is determined as YES in step (S34), the process goes to step (S8).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An exhaust gas processing device for a diesel engine, the device comprising:
    a DPF (1);
    a DPF regeneration section (3);
    an electronic control unit (14) with integral circuitry comprising a PM accumulation amount estimating section (2) for PM accumulated in the DPF (1), a DPF regeneration control section (4), and memory (5);
    an accelerated regeneration requiring information notification section (6);
    an accelerated regeneration starting operation section (7); and
    an accelerated regeneration re-requirement notification section (41), wherein
    an accelerated regeneration requirement determination value J2, a normal regeneration starting determination value J3, and a normal regeneration prohibition and accelerated regeneration re-requirement determination value J4 higher than the determination values J2 and J3 are stored in the memory (5),
    the DPF regeneration control section (4) is programmed to compare a PM accumulation amount estimate obtained by the PM accumulation amount estimating section (2) with the plurality of determination values J2, J3, and J4,
    automatically start normal regeneration processing by the DPF regeneration section (3) to increase a temperature of exhaust gas (11) to be passed through the DPF (1) when the PM accumulation amount estimate increases to the normal regeneration starting determination value J3,
    start notification of accelerated regeneration requiring information by the accelerated regeneration requiring information notification section (6) when the PM accumulation amount estimate is equal to or higher than the accelerated regeneration requirement determination value J2 as a result of determination for accelerated regeneration requirement after the start of normal regeneration processing,
    switch the normal regeneration processing by the DPF regeneration section (3) to accelerated regeneration processing to increase the temperature of the exhaust gas (11) to be passed through the DPF (1) as in the normal regeneration processing to make regeneration speed of the DPF (1) higher than that in the normal regeneration processing when the accelerated regeneration starting operation section (7) carries out accelerated regeneration starting operation after the notification of the accelerated regeneration requiring information is started,
    continue the normal regeneration processing by the DPF regeneration section (3) when the accelerated regeneration starting operation section (7) does not carry out the accelerated regeneration starting operation after the notification of the accelerated regeneration requiring information is started, and
    prohibit the normal regeneration processing, wherein the accelerated regeneration re-requirement notification section (41) starts notification of accelerated regeneration re-requiring information when the PM accumulation amount estimate becomes equal to or higher than the normal regeneration prohibition and accelerated regeneration re-requirement determination value J4, and thereafter, the DPF regeneration control section (4) is programmed to not carry out the regeneration processing of the DPF (1) unless the accelerated regeneration starting operation section (7) starts the accelerated regeneration starting operation to cause the DPF regeneration control section (4) to carry out the accelerated regeneration processing by the DPF regeneration section (3).

2. The exhaust gas processing device for the diesel engine according to claim 1, further comprising a serviceman call requiring information notification section (42) wherein
a DPF regeneration prohibition and serviceman call requirement determination value J5 higher than the accelerated regeneration re-requirement determination value J4 is stored in the memory (5), and
the DPF regeneration control section (4) is programmed to prohibit the normal regeneration and the accelerated regeneration by the DPF regeneration section (3) and the serviceman call requiring information notification section (42) starts the notification of the serviceman call requiring information when the PM accumulation amount estimate becomes equal to or higher than the regeneration prohibiting and serviceman call requiring determination value J5.

3. The exhaust gas processing device for the diesel engine according to claim 1, wherein
a limp home operation mode switching determination value J6 higher than the accelerated regeneration re-requirement determination value J4 is stored in the memory (5), and
the electronic control unit (14) switches an engine operation state to a limp home operation mode to restrict engine output when the PM accumulation amount estimate becomes equal to or higher than the limp home operation mode switching determination value J6.

4. The exhaust gas processing device for the diesel engine according to claim 1, wherein
the DPF regeneration control section (4) is programmed to end the accelerated regeneration processing when the DPF regeneration control section (4) is carrying out the accelerated regeneration processing by the DPF regeneration section (3) and when the PM accumulation amount estimate decreases to the accelerated regeneration requirement determination value J2 which is a lower limit for the accelerated regeneration requirement.

5. The exhaust gas processing device for the diesel engine according to claim 1, wherein
a normal regeneration ending determination value J1 lower than the accelerated regeneration requirement determination value J2 is stored in the memory (5), and
the DPF regeneration control section (4) is programmed to end the normal regeneration processing when the PM accumulation estimate decreases to the normal regeneration ending determination value J1 as a result of the normal regeneration processing.

6. The exhaust gas processing device for the diesel engine according to claim 1, wherein
the normal regeneration processing is carried out during operation of a machine mounted with the engine when at least one of traveling and working is carried out by the machine, and
the accelerated regeneration processing is carried out during a non-operating time of the machine mounted with the engine when both of the traveling and the working by the machine are interrupted.

7. The exhaust gas processing device for the diesel engine according to claim 1, wherein
the DPF regeneration section (3) is formed by a combination of a common rail system (9) and a DOC (10) disposed on an upstream side of the DPF (1),
unburned fuel is mixed into the exhaust gas by post injection carried out after main injection from an injector (27) of the common rail system (9), and
the DOC (10) oxidizes and burns the unburned fuel with oxygen in the exhaust gas to increase the temperature of the exhaust gas passing through the DPF (1) in the normal regeneration processing and the accelerated regeneration processing.

8. The exhaust gas processing device for the diesel engine according to claim 1, wherein
a determination suspension time T1 for the accelerated regeneration requirement is stored in the memory (5),
the normal regeneration starting determination value J3 is higher than the accelerated regeneration requirement determination value J2, and
a time T3 for determination of the accelerated regeneration requirement is when the determination suspension time T1 for the accelerated regeneration requirement has elapsed without ending the normal regeneration processing after the PM accumulation amount estimate increased to the normal regeneration starting determination value J3.

9. The exhaust gas processing device for the diesel engine according to claim 8, wherein
a re-determination time T2 for the accelerated regeneration requirement is stored in the memory (5),
the DPF regeneration control section (4) is programmed to continue the normal regeneration processing even during the re-determination time T2 for the accelerated regeneration requirement subsequent to the determination time T3 for the accelerated regeneration requirement when the PM accumulation amount estimate is lower than the accelerated regeneration requirement determination value J2 at the determination time T3 for the accelerated regeneration requirement,
the DPF regeneration control section (4) is programmed to start the notification of the accelerated regeneration requiring information by the accelerated regeneration requiring information notification section (6) when the PM accumulation amount estimate increases to the accelerated regeneration requirement determination value J2 during the re-determination time T2 for the accelerated regeneration requirement,
a time when the re-determination time T2 for the accelerated regeneration requirement has elapsed is a re-determination ending time T4, and
the DPF regeneration control section (4) is programmed to end the normal regeneration processing when the DPF accumulation estimate has not increased to the accelerated regeneration requirement determination value J2 at the re-determination ending time T4.

* * * * *